(12) United States Patent
Asaoka et al.

(10) Patent No.: US 8,922,737 B2
(45) Date of Patent: Dec. 30, 2014

(54) DISPLAY DEVICE

(75) Inventors: Yasushi Asaoka, Osaka (JP); Kiyoshi Minoura, Osaka (JP); Kazuhiro Deguchi, Oskaki (JP); Eiji Satoh, Osaka (JP); Sayuri Fujiwara, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 162 days.

(21) Appl. No.: 13/695,579

(22) PCT Filed: Apr. 18, 2011

(86) PCT No.: PCT/JP2011/059542
§ 371 (c)(1),
(2), (4) Date: Oct. 31, 2012

(87) PCT Pub. No.: WO2011/136072
PCT Pub. Date: Nov. 3, 2011

(65) Prior Publication Data
US 2013/0044280 A1    Feb. 21, 2013

(30) Foreign Application Priority Data

Apr. 28, 2010 (JP) ................. 2010-103397

(51) Int. Cl.
*G02F 1/1333* (2006.01)
*G02F 1/133* (2006.01)
*G02F 1/137* (2006.01)
*G02F 1/1335* (2006.01)
*F21V 8/00* (2006.01)
*G02F 1/1362* (2006.01)

(52) U.S. Cl.
CPC .... *G02F 1/133617* (2013.01); *G02F 2202/046* (2013.01); *G02F 2001/13324* (2013.01); *G02F 2001/13756* (2013.01); *G02F 1/133365* (2013.01); *G02F 2001/133614* (2013.01); *G02B 6/0021* (2013.01); *G02F 1/137* (2013.01); *G02F 1/133615* (2013.01); *G02F 2201/122* (2013.01); *G02F 1/1362* (2013.01); *G02F 2001/13775* (2013.01); *G02F 2201/086* (2013.01)
USPC .............................. 349/86; 349/88; 349/164

(58) Field of Classification Search
USPC ............................................. 349/164, 86, 88
See application file for complete search history.

(56) References Cited

U.S. PATENT DOCUMENTS 8,675,167 B2 * 3/2014 Jang et al. ................. 349/163
2007/0268427 A1  11/2007 Uehara

FOREIGN PATENT DOCUMENTS

JP         5-173116      7/1993
JP         7-84275       3/1995
(Continued)

OTHER PUBLICATIONS

International Search Report for PCT/JP2011/059542 mailed Jun. 21, 2011.

*Primary Examiner* — James Dudek
(74) *Attorney, Agent, or Firm* — Nixon & Vanderhye, P.C.

(57) ABSTRACT

A display device capable of emitting sufficient fluorescence is provided without an increase in the thickness of the liquid crystal layer. The device includes: a fluorescent emission layer (23) having fluorescent pigment molecules that absorb light to emit fluorescence; and a liquid crystal layer (4) capable of switching between a transparent state and a scattering state. The fluorescent pigment molecules are dichroic fluorescent pigment molecules (23a) with different emission intensities depending on the direction of emission. The dichroic fluorescent pigment molecules (23a) in the fluorescent emission layer (23) are oriented so as to have transition dipole moments with the same direction.

13 Claims, 6 Drawing Sheets

(56) References Cited

FOREIGN PATENT DOCUMENTS

| JP | 8-29812 | 2/1996 |
|----|---------|--------|
| JP | 11-024049 | 1/1999 |
| JP | 11-202327 | 7/1999 |
| JP | 2001-264756 | 9/2001 |
| JP | 2002-131729 | 5/2002 |
| JP | 2007-334334 | 12/2007 |

* cited by examiner

FIG. 12

DISPLAY DEVICE

This application is the U.S. national phase of International Application No. PCT/JP2011/059542 filed 18 Apr. 2011 which designated the U.S. and claims priority to JP 2010-103397 filed 28 Apr. 2010, the entire contents of each of which are hereby incorporated by reference.

TECHNICAL FIELD

The present invention relates to a display device capable of emitting fluorescence depending on orientation of liquid crystal in the liquid crystal layer.

BACKGROUND ART

Display devices capable of emitting fluorescence while controlling orientation of liquid crystal are known. In such a display device, as disclosed in JP-Hei 5(1993)-173116 A, for example, pigment is added to the liquid crystal layer and the orientation of the pigment is changed depending on the movement of liquid crystal in the liquid crystal layer. For example, when no voltage is applied and the liquid crystal is in a random state, the pigment is also in a random state such that the color of the liquid crystal layer is that of the pigment. When a voltage is applied and the liquid crystal is in an oriented state, the pigment is also in an oriented state such that the liquid crystal layer is transparent. JP-Hei 5-173116 A also describes adding fluorescent material to the liquid crystal layer to increase the intensity of color of the pigment.

DISCLOSURE OF THE INVENTION

In an arrangement with fluorescent material added to the liquid crystal layer, as disclosed in JP-Hei 5-173116 A, it is preferable to use a significant amount of fluorescent material in the liquid crystal panel in order to allow the display panel to emit bright fluorescence. However, it is difficult to allow the display panel to emit clear fluorescence under a bright environment since the solubility of fluorescent material in liquid crystal is limited.

To solve this problem, the thickness of the liquid crystal layer may be increased to allow a sufficient amount of fluorescent material to be added to the liquid crystal layer. However, this requires increased voltage applied to the liquid crystal layer and is thus impractical.

An object of the present invention is to provide a display device capable of emitting sufficient fluorescence without increasing the thickness of the liquid crystal layer.

A display device according to an aspect of the present invention includes: a fluorescent emission layer having fluorescent pigment molecules that absorb light to emit fluorescence; and a liquid crystal layer capable of switching between a transparent state and a scattering state, wherein the fluorescent pigment molecules are dichroic fluorescent pigment molecules with different emission intensities depending on a direction of emission, and the dichroic fluorescent pigment molecules in the fluorescent emission layer are oriented so as to have transition dipole moments with the same direction.

The present invention provides a display device capable of emitting sufficient fluorescence without increasing the thickness of the liquid crystal layer.

EMBODIMENTS FOR CARRYING OUT THE INVENTION

A display device according to an embodiment of the present invention includes: a fluorescent emission layer having fluorescent pigment molecules that absorb light to emit fluorescence; and a liquid crystal layer capable of switching between a transparent state and a scattering state, wherein the fluorescent pigment molecules are dichroic fluorescent pigment molecules with different emission intensities depending on a direction of emission, and the dichroic fluorescent pigment molecules in the fluorescent emission layer are oriented so as to have transition dipole moments with the same direction (first arrangement).

In the above arrangement, the liquid crystal layer and the fluorescent emission layer containing fluorescent pigment are separated from each other. As such, fluorescent pigment need not be dissolved in the liquid crystal layer, eliminating the necessity to increase the thickness of the liquid crystal layer so as to allow a significant amount of fluorescent pigment to be added to the liquid crystal layer. In order to provide sufficient fluorescence in the above arrangement, the thickness of the fluorescent emission layer may be suitably increased. Thus, the above arrangement allows the amount of emission to be varied without changing the voltage applied to the liquid crystal layer.

Moreover, the fluorescent pigment molecules in the fluorescent emission layer are dichroic fluorescent pigment molecules with different emission intensities depending on the direction of emission. Thus, as the molecules have transition dipole moments with the same direction, the dichroic fluorescent pigment molecules are capable of emitting light in the same direction, allowing the fluorescent emission layer to emit light with increased brightness or improved contrast.

Furthermore, in the above arrangement, refraction conditions for intensive light emitted from dichroic fluorescent pigment molecules may be changed within the display device to change the intensity of fluorescent light. That is, liquid crystal in the liquid crystal layer may be controlled to cause bright light emitted from dichroic fluorescent pigment molecules to be scattered by liquid crystal and then to be let out, or to be totally reflected in the display device and to be trapped within the display device. Thus, liquid crystal within the liquid crystal layer may be controlled to change conditions of fluorescent light of the display device.

In the first arrangement above, it is preferable that the dichroic fluorescent pigment molecules in the fluorescent emission layer are oriented such that the direction of the transition dipole moments is in agreement with a thickness direction of the fluorescent emission layer (second arrangement).

A dichroic fluorescent pigment molecule has the property of emitting, in a direction perpendicular to that of the transition dipole moments, light oscillating in a direction parallel to that of the transition dipole moments. As such, when the liquid crystal in the liquid crystal layer is in the scattering state, the above arrangement causes light emitted in a direction perpendicular to that of the transition dipole moments of the dichroic fluorescent pigment molecules to be scattered by the liquid crystal and to be let out. When the liquid crystal in the liquid crystal layer is in the transparent state, light emitted in a direction perpendicular to that of the transition dipole moments of the dichroic fluorescent pigment molecules is totally reflected repeatedly within a transparent layer containing, for example, a liquid crystal layer, a fluorescent emission layer and other layers. Thus, in the above arrangement, the liquid crystal in the liquid crystal layer may be controlled to control fluorescent light from the display device.

It should be noted that "the direction of the transition dipole moments of the dichroic fluorescent pigment molecules is in agreement with a thickness direction of the fluorescent emission layer" includes exact agreement as well as the direction of their transition dipole moments being at an angle relative to the thickness direction.

In the first or second arrangement above, it is preferable that an ultraviolet absorbing layer that absorbs ultraviolet light is provided between the fluorescent emission layer and the liquid crystal layer (third arrangement).

Thus, the fluorescent emission layer is directly illuminated with ultraviolet light such that the dichroic fluorescent pigment molecules in the fluorescent emission layer can efficiently absorb ultraviolet light and emit light. Ultraviolet light that has not been absorbed by the dichroic fluorescent pigment molecules in the fluorescent emission layer is absorbed by the ultraviolet absorbing layer such that it does not reach the liquid crystal layer. Thus, dichroic fluorescent pigment molecules can emit brighter light using ultraviolet light and the liquid crystal layer can be protected from ultraviolet light.

In any one of the first to third arrangements, above it is preferable that the fluorescent emission layer includes a light emitting layer formed as a sheet and a bonding layer that bonds the light emitting layer to a bonded portion, and an ultraviolet absorbing agent is added to at least one of the light emitting layer and the bonding layer (fourth arrangement).

As the fluorescent emission layer is formed as a sheet, a fluorescent emission layer may be easily provided on the display device by attaching the sheet-like fluorescent emission layer to the substrate or the like. Moreover, the ultraviolet absorbing agent added to at least one of the light emitting and bonding layers will prevent ultraviolet light from reaching the liquid crystal layer.

In any one of the first to fourth arrangements above, it is preferable that an electrode is only provided on one side of the liquid crystal layer as viewed in a thickness direction thereof, and the electrode is a pectinate electrode having comb-teeth shaped portions (fifth arrangement).

Thus, an electric field can be generated around the pectinate electrode, eliminating the necessity to laminate a common electrode in a thickness direction of the liquid crystal layer. This prevents light reflection or absorption that would occur if a transparent common electrode of indium tin oxide (ITO) or the like were formed, thereby allowing light to be efficiently introduced into the liquid crystal layer.

In any one of the first to fifth arrangements, it is preferable that a light guide plate for introducing light from a light source into the fluorescent emission layer is provided on the fluorescent emission layer (sixth arrangement).

Thus, light from the light source is repeatedly reflected in the light guide plate and enters the fluorescent emission layer. In this case, light enters at an angle relative to a thickness direction of the fluorescent emission layer, such that light enters the dichroic fluorescent pigment molecules in the fluorescent emission layer in a direction perpendicular to that of the transition dipole moments. As such, the properties of dichroic fluorescent pigment molecules cause the dichroic fluorescent pigment molecules to emit brighter light. Thus, in the arrangement above, the dichroic fluorescent pigment molecules can emit brighter fluorescence.

In any one of the first to sixth arrangements above, it is preferable that a photovoltaic unit that receives light emitted from dichroic fluorescent pigment molecules in the fluorescent emission layer and generates electricity is provided outside the fluorescent emission layer as viewed in a planar direction (seventh arrangement).

Thus, light emitted from dichroic fluorescent pigment molecules in the fluorescent emission layer can be converted into electricity by the photovoltaic unit.

In the seventh arrangement above, it is preferable that the photovoltaic unit is provided with a light receiving face that faces an end of the fluorescent emission layer as viewed in a planar direction (eight arrangement). Thus, if dichroic fluorescent pigment molecules are disposed in the fluorescent emission layer such that the direction of the transition dipole moments is in agreement with a thickness direction of the fluorescent emission layer, light emitted from dichroic fluorescent pigment molecules can be efficiently received by the photovoltaic unit. Thus, positioning the photovoltaic unit in the manner described above will allow the photovoltaic unit to generate electricity efficiently.

Preferred embodiments of the semiconductor device of the present invention will now be described with reference to the drawings. It should be noted that the sizes of the components in the drawings do not exactly represent the sizes of actual components or size ratios of the components.

First Embodiment

Overall Configuration

Figure 1:
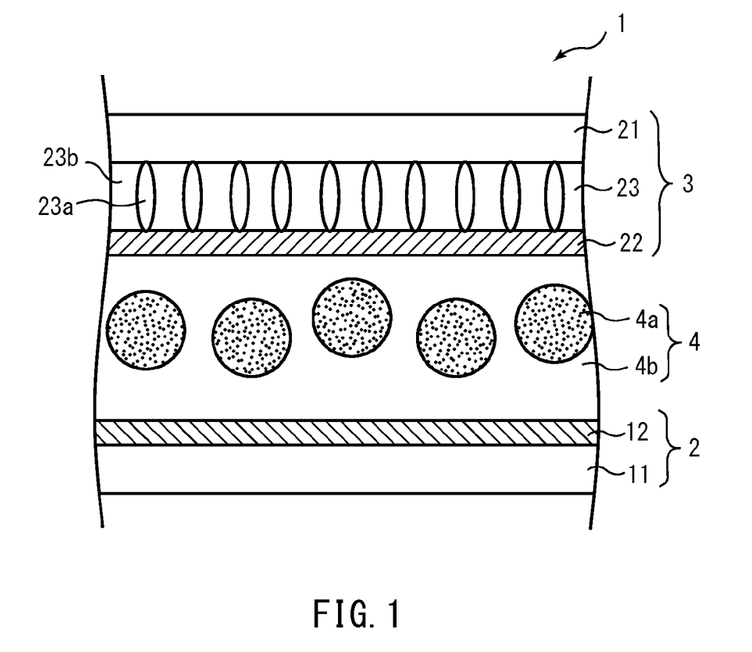
FIG. 1 is a schematic cross-sectional view of a display panel of a display device according to a first embodiment.

FIG. 1 schematically shows a display panel 1 of a liquid crystal display device (display device) according to a first embodiment. The display panel 1 includes an active matrix substrate 2, a counter substrate 3, and a liquid crystal layer 4 sandwiched therebetween.

The active matrix substrate 2 includes a substrate 11 including multiple pixels provided in a matrix. The active matrix substrate 2 also includes pixel electrodes 12 and thin film transistors (hereinafter referred to as "TFTs") corresponding to the pixels. The substrate 11 is made of a translucent glass substrate, and the pixel electrodes 12 are made of a transparent conductive film. That is, in the present embodiment, the active matrix substrate 2 is a transmissive substrate that allows light to pass through it.

The counter substrate 3 includes a base substrate 21 made of glass, a common electrode 22 opposite the pixel electrodes 12 of the active matrix substrate 2, and a fluorescent emission layer 23 having dichroic fluorescent pigment molecules 23a. The fluorescent emission layer 23 is provided between the base substrate 21 and the common electrode 22. That is, in the counter substrate 3, the common electrode 22 opposite the pixel electrodes 12 of the active matrix substrate 2, the fluorescent emission layer 23 and the base substrate 21 are stacked in this stated order, beginning from the layer closest to the active matrix substrate 2. Similar to the pixel electrodes 12 of the active matrix substrate 2, the common electrode 22 of the counter substrate 3 is made of a transparent conductive film. The structure of the fluorescent emission layer 23 will be described below.

The liquid crystal layer 4 is formed by dispersing liquid crystal in the shape of liquid crystal droplets 4a in polymer matrix 4b. That is, the liquid crystal display device of the present embodiment is a display device including so-called polymer dispersed liquid crystal (hereinafter referred to as "PDLC").

In the liquid crystal layer 4, liquid crystal molecules in liquid crystal droplets 4a are randomly oriented (i.e. in a scattering state) when no voltage is applied between the pixel electrodes 12 and the common electrode 22. Thus, the polymer matrix 4b and the liquid crystal droplets 4a have different refractive indices such that light is scattered at the interfaces therebetween.

When a voltage is applied between the pixel electrodes 12 and the common electrode 22, the liquid crystal molecules in the liquid crystal droplets 4a are oriented with their molecular axes aligned in a predetermined direction (i.e. in an oriented state). Thus, the polymer matrix 4b and the liquid crystal droplets 4a have substantially the same refractive index, reducing scattering at the interfaces therebetween, thereby making the liquid crystal layer 4 transparent.

The liquid crystal display device is configured to apply a voltage between the pixel electrodes 12 and the common electrode 22 by driving TFTs in the active matrix substrate 2 in response to signals from a driver provided on the active matrix substrate 2. The liquid crystal display device is also configured to control liquid crystal in the liquid crystal layer 4 by means of such a voltage applied between the pixel electrodes 12 and the common electrode 22 to display an image on the display panel 1.

(Fluorescent Emission Layer)

Next, the structure of the fluorescent emission layer 23 provided between the base substrate 21 and the common electrode 22 in the counter substrate 3 will be described.

The fluorescent emission layer 23 includes dichroic fluorescent pigment molecules 23a and liquid crystal polymer 23b that holds the dichroic fluorescent pigment molecules 23a. The dichroic fluorescent pigment molecules 23a has an absorption band of an ultraviolet wavelength region (for example, 10 nm to 400 nm) and a visible light wavelength region (for example, 380 nm to 750 nm), and are made of a material with a dichroic ratio of 5 or more. The dichroic fluorescent pigment molecules 23a are made of, for example, benzothiadiazole-based or coumalin-, cyanine-, pyridine-, rhodamine-, styryl- or anthraquinone-based fluorescent pigment.

Dichroic fluorescent pigment molecules 23a have the property of absorbing light such as ultraviolet or visible light and emit fluorescence. Dichroic fluorescent pigment molecules 23a have the absorption property of the absorption coefficient of light oscillating in a direction parallel to their long molecular axis (i.e. light that advances in a direction perpendicular to their long molecular axis) being larger than the absorption coefficient of light oscillating in a direction perpendicular to their long molecular axis (i.e. light that advances parallel to their long molecular axis). In other words, the long molecular axis of dichroic fluorescent pigment molecules 23a of the present embodiment is in agreement with the direction of their transition moments for light absorption.

Further, the dichroic fluorescent pigment molecules 23a have the emission property of the fluorescent emission coefficient in a direction parallel to their long molecular axis being larger than the fluorescent emission coefficient in a direction perpendicular to their long molecular axis. In other words, the long molecular axis of the dichroic fluorescent pigment molecules 23a of the present embodiment is in agreement with the direction of their transition moments for emission. Consequently, the dichroic fluorescent pigment molecules 23a emit stronger light in a direction perpendicular to their long molecular axis. In the drawings for the following description, the dichroic fluorescent pigment molecules 23a are depicted as vertically long ellipses, whose longitudinal direction corresponds to their long molecular axis.

The liquid crystal polymer 23b is made of a resin material that allows the dichroic fluorescent pigment molecules 23a to be oriented such that their long molecular axis is in agreement with the direction of stacking of the layers (i.e. a thickness direction of the fluorescent emission layer 23), as shown in FIG. 1. Specifically, the liquid crystal polymer 23b is made of a compound having a photoreactive group at a molecule end or a diacrylate compound having a liquid crystal framework. It should be noted that an ultraviolet absorbing material that absorbs ultraviolet light may be mixed with the liquid crystal polymer 23b. Thus, ultraviolet light passing through the fluorescent emission layer 23 can be reduced in a more reliable manner, thereby protecting the liquid crystal layer 4 from ultraviolet light.

As discussed above, dichroic fluorescent pigment molecules 23a may be held in the fluorescent emission layer 23 by liquid crystal polymer 23b to allow stronger light to be emitted from dichroic fluorescent pigment molecules 23a in a direction perpendicular to the long molecular axis of the dichroic fluorescent pigment molecules 23a, i.e. in a planar direction of the display panel 1. On the other hand, only weak light is emitted from dichroic fluorescent pigment molecules 23a in a direction parallel to the long molecular axis of the dichroic fluorescent pigment molecules 23a, i.e. a thickness direction of the fluorescent emission layer 23. Accordingly, as indicated by thin solid lines in FIGS. 2 and 3, almost no light is emitted from dichroic fluorescent pigment molecules 23a directly to the outside of the display panel 1.

Figure 2:
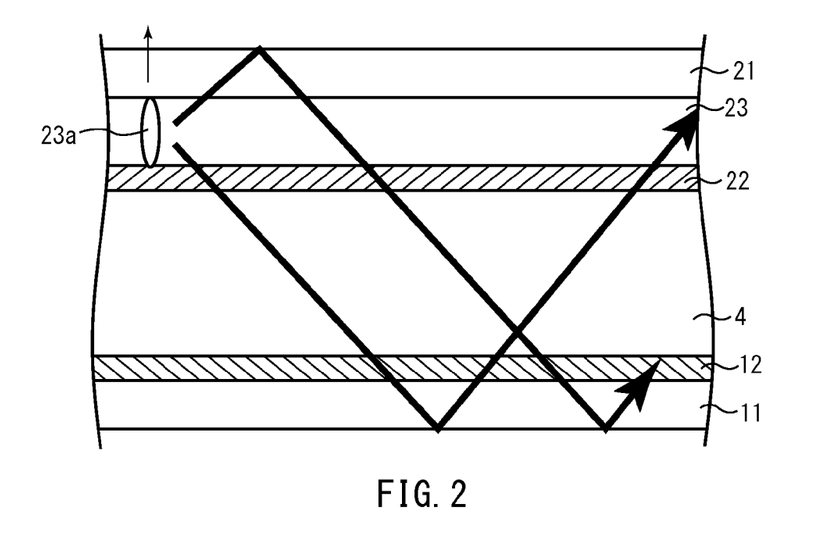
FIG. 2 illustrates how light emitted by dichroic fluorescent pigment is reflected within the display panel when the liquid crystal layer is in the transparent state in the display panel of the display device according to the first embodiment.

As discussed above, each layer of the display panel 1 is made of a transparent material such that light emitted from dichroic fluorescent pigment molecules 23a in a planar direction of the display panel 1 is reflected from an interface between the display panel 1 and air. More specifically, as shown in FIG. 2, when a voltage is applied to the liquid crystal layer 4 and the liquid crystal layer 4 is transparent, light emitted from dichroic fluorescent pigment molecules 23a is totally reflected from the interface between the layer and air and is reflected repeatedly within the display panel 1 (see thick arrows). Light emitted from dichroic fluorescent pigment molecules 23a at an incident angle relative to the interface between the layer and air that is smaller than the total reflection angle is emitted to the outside.

Figure 3:
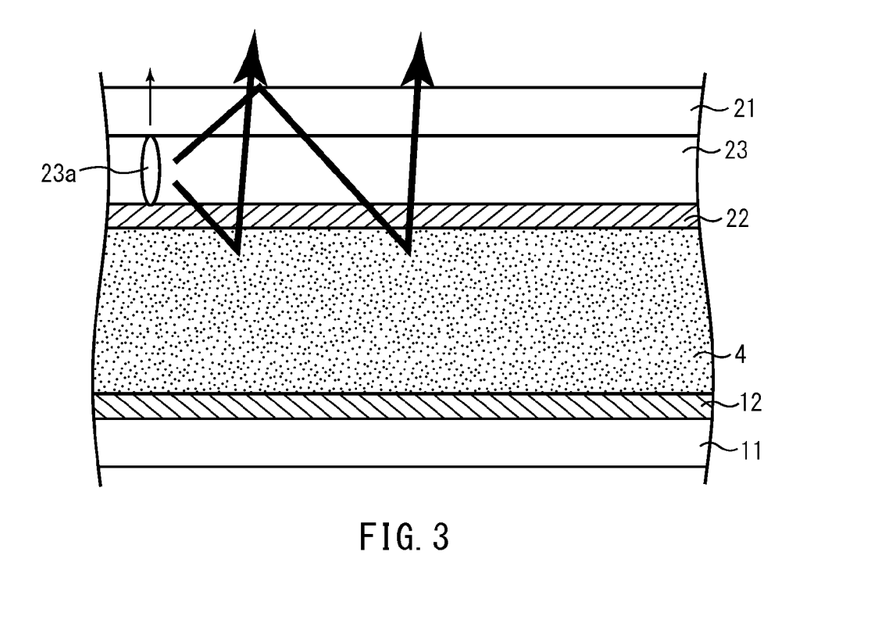
FIG. 3 illustrates how light emitted by dichroic fluorescent pigment is scattered within the display panel when the liquid crystal layer is in the scattering state in the display panel of the display device according to the first embodiment.

On the contrary, as shown in FIG. 3, when no voltage is applied to the liquid crystal layer 4 and the liquid crystal layer 4 is in the scattering state, light emitted from dichroic fluorescent pigment molecules 23a is scattered by the liquid crystal layer 4 and emitted to the outside of the display panel 1 (see thick arrows). Moreover, a portion of light scattered by the liquid crystal layer 4 is reflected within the display panel 1 and returns to dichroic fluorescent pigment molecules 23a such that the amount of light absorbed by dichroic fluorescent pigment molecules 23a is larger than is the case in FIG. 2. Thus, dichroic fluorescent pigment molecules 23a emit brighter light than is the case in FIG. 2.

Further, as discussed above, dichroic fluorescent pigment molecules 23a absorb ultraviolet light. Thus, as discussed above, a fluorescent emission layer 23 provided on the side of the liquid crystal layer 4 closer to the front side of the display panel 1 can reduce the amount of ultraviolet light reaching the liquid crystal layer 4.

It should be noted that the depiction of liquid droplets 4a in the liquid crystal layer 4 is omitted in FIGS. 2 and 3 in order to illustrate the difference in the state of the liquid crystal layer 4 between the two drawings clearly and in a simplified manner.

(Method of Manufacturing Display Panel)

Now, a method of manufacturing such a display panel will be described.

First, on a base substrate 21 is formed a fluorescent emission layer 23. The fluorescent emission layer 23 is formed by spin coating, for example. Specifically, dichroic fluorescent pigment molecules 23a are added to the liquid crystal polymer 23b, which is then stirred until the dichroic fluorescent pigment molecules 23a are dissolved to make a mixture. Then, to improve the wettability of the mixture with the base substrate 21, an oriented film is formed on the base substrate 21. Thereafter, the mixture is applied to the oriented film before the base substrate 21 is spun to coat the oriented film with the mixture to a predetermined thickness. After the resulting structure is heated to evaporate the solvent, it is illuminated with ultraviolet light to cure the liquid crystal polymer 23b. Thus, a fluorescent emission layer 23 is formed on the base substrate 21.

It should be noted that the mixture may be applied to the oriented film by a slit coater, instead of by spin coating as discussed above.

Next, a common electrode 22 is formed on the fluorescent emission layer 23 by sputtering, for example. Then, a spacer that is to be positioned between the common electrode 22 and an active matrix substrate 2 is provided on the common electrode. Thus, a counter substrate 3 is formed.

Next, an oriented film is provided on each of the counter substrate 3 and the active matrix substrate 2. Since the active matrix substrate 2 may be manufactured in a conventional method, description of a method of manufacturing the active matrix substrate 2 will be omitted. A pattern of seal of a light curing resin is formed on the counter substrate 3. Thereafter, droplets of a mixture of liquid crystal, polymer matrix 4b and other ingredients are applied to the counter substrate 3, which is then attached to the active matrix substrate 2 in vacuum.

Thereafter, the pressure is returned to atmospheric pressure and, when the mixture described above is spread in the seal pattern, it is illuminated, from the side of the counter substrate 3, with ultraviolet light having wavelengths not higher than 340 nm removed. Thus, the seal resin is cured to produce PDLC. Thereafter, the counter substrate 3 and active matrix substrate 2, as combined together, are baked to completely cure the seal.

Thus, a display panel 1 as shown in FIG. 1 is provided.

Effects of First Embodiment

In the present embodiment, a fluorescent emission layer 23 containing dichroic fluorescent pigment molecules 23a is provided as a separate layer from the liquid crystal layer 4. This makes it possible to increase the thickness of the fluorescent emission layer 23 to provide sufficient fluorescence without changing the voltage applied to the liquid crystal layer 4.

Moreover, as dichroic fluorescent pigment molecules 23a are disposed such that their long molecular axis is parallel to a thickness direction of the fluorescent emission layer 12 in the fluorescent emission layer 23, the display panel 1 can be switched between on and off of fluorescence. Dichroic fluorescent pigment molecules 23a emit strong light in a direction perpendicular to their long molecular axis, while they emit weak light in a direction parallel to their long molecular axis. Thus, as the dichroic fluorescent pigment molecules 23a are disposed as described above, almost no light is emitted from dichroic fluorescent pigment molecules 23a directly to the outside of the display panel 1. On the contrary, light emitted from dichroic fluorescent pigment molecules 23a in a direction perpendicular to their long molecular axis is reflected within the display panel 1 and is trapped in the display panel 1 when the liquid crystal layer 4 is in the transparent state; when the liquid crystal layer 4 is in the scattering state, such light is scattered in the liquid crystal layer 4 and is then emitted to the outside of the display panel 1. Thus, fluorescence of the display panel 1 can be controlled by controlling the liquid crystal in the liquid crystal layer 4.

Further, since dichroic fluorescent pigment molecules 23a absorb ultraviolet light as well, the arrangement of the present embodiment can reduce the amount of ultraviolet light reaching the liquid crystal layer 4.

Variation 1 of First Embodiment

Figure 4:
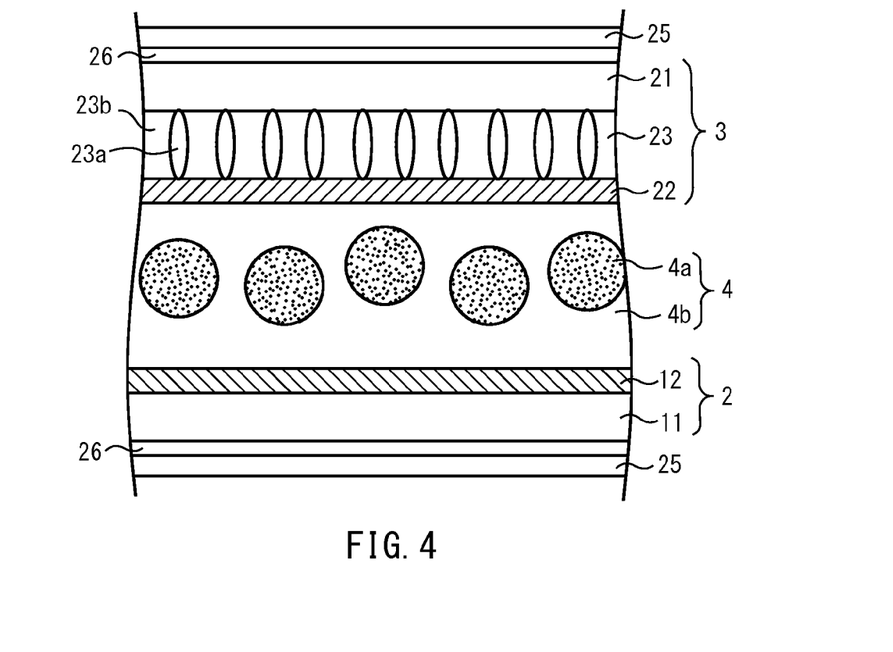
FIG. 4 is a schematic cross-sectional view of a display panel of a display device according to Variation 1 of the first embodiment.

As shown in FIG. 4, this variation is different from the first embodiment in that ultraviolet absorbing films 25, 25 are placed on the respective sides of the display panel 1 shown in FIG. 1. In the description below, the components that are the same as those of the first embodiment are labeled with the same characters, and only the differences will be described.

Specifically, an ultraviolet absorbing film 25 is attached to the base substrate 21 of the counter substrate 3 by means of adhesive 26. Also, an ultraviolet absorbing film 25 is attached to the substrate 11 of the active matrix substrate 2 by means of adhesive 26. These ultraviolet absorbing films 25, 25 are configured to block light with a wavelength not higher than 480 nm.

Thus, ultraviolet light can be prevented from reaching the liquid crystal layer 4, thereby protecting the liquid crystal layer 4.

Variation 2 of First Embodiment

Figure 5:
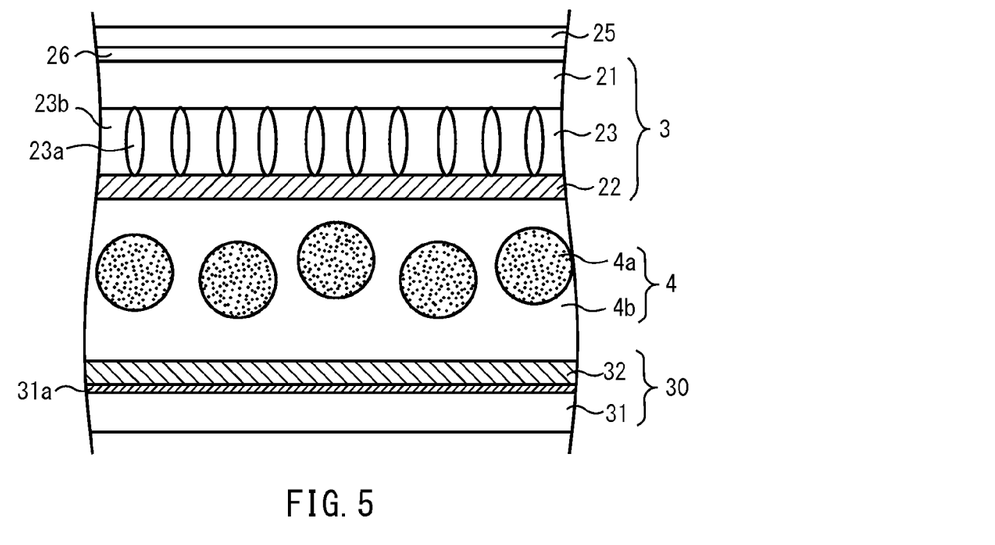
FIG. 5 is a schematic cross-sectional view of a display panel of a display device according to Variation 2 of the first embodiment.

As shown in FIG. 5, this variation is different from the first embodiment in that the active matrix substrate 30 is a reflective substrate, not a transparent one. In the description below, the components that are the same as those of the first embodiment are labeled with the same characters, and only the differences will be described.

Specifically, the active matrix substrate 30 includes a substrate 31 having a reflective layer 31a, a pixel electrode 32 formed on the substrate 31, and TFTs, not shown, also formed on the substrate 31. Thus, light entering the counter substrate 3 is reflected from the substrate 31.

Thus, light emitted from dichroic fluorescent pigment molecules 23a of the fluorescent emission layer 23 is reflected from the substrate 31 of the active matrix substrate 30.

In this variation, an ultraviolet absorbing film 25 similar to that of Variation 1 above is provided on the counter substrate 3, which allows light to pass through it. The present variation is not limited to this arrangement, and no ultraviolet absorbing film 25 may be provided.

Second Embodiment

Figure 6:
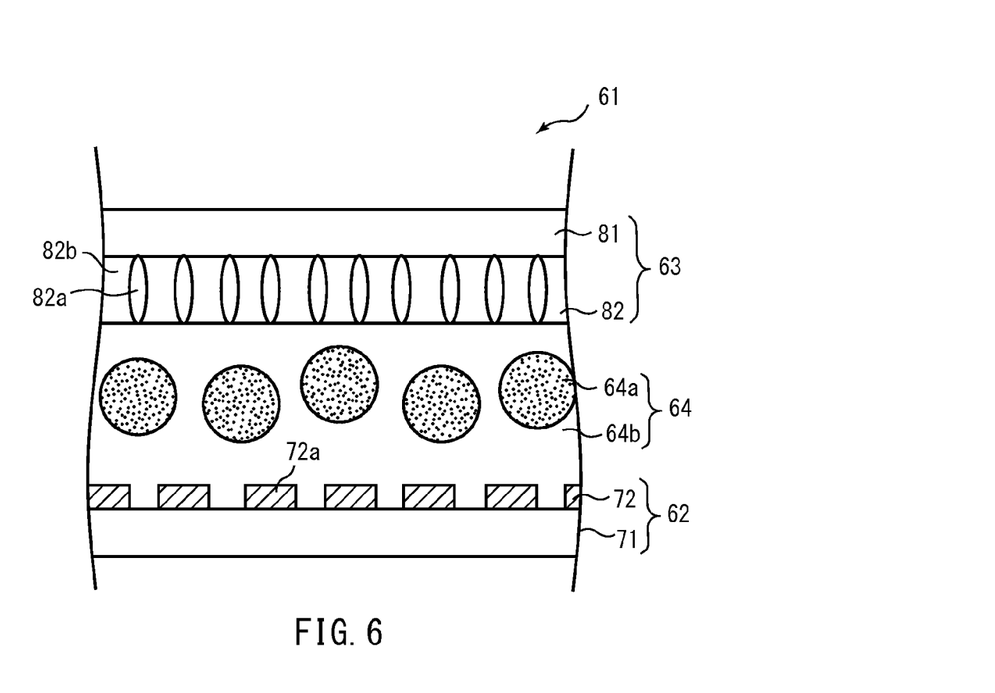
FIG. 6 is a schematic cross-sectional view of a display panel of a display device according to a second embodiment.

FIG. 6 schematically shows a display panel 61 according to a second embodiment. This embodiment is different from the first embodiment in the configuration of the pixel electrode. The differences between the first and second embodiments will be mainly described.

Specifically, the display panel 61 includes an active matrix substrate 62, a counter substrate 63 and a liquid crystal layer 64 sandwiched therebetween.

The active matrix substrate 62 includes a substrate 71 with multiple pixels provided in a matrix. Further, a pectinate electrode 72 and TFTs (not shown) are provided on the active matrix substrate 62. The substrate 71 is made of a translucent glass substrate, and the pectinate electrode 72 is made of a transparent, conductive film. That is, in the present embodiment, the active matrix substrate 62 is a transparent substrate that allows light to pass through it.

The pectinate electrode 72 includes a plurality of line-shaped conductive members 72a formed parallel to each other on the substrate 71. In other words, the plurality of conductive members 72a are formed as stripes. In the present embodiment, the pectinate electrode 72 is formed in such a way that those conductive members 72a that function as pixel electrodes and those conductive members 72a that function as a common electrode are arranged in an alternating manner. Thus, as a voltage is applied to the liquid crystal layer 64 by the pectinate electrode 72, the liquid crystal in the liquid crystal layer 64 is controlled by an electric field generated between the conductive members 72a.

The counter substrate 63 includes a base substrate 81 made of glass and a fluorescent emission layer 82 having dichroic fluorescent pigment molecules 82a. The fluorescent emission layer 82 is provided on the base substrate 81 so as to be positioned between the base substrate 81 and the liquid crystal layer 64. In other words, in the counter substrate 63, the fluorescent emission layer 82 and the base substrate 81 are stacked in this stated order, beginning from the layer close to the active matrix substrate 62. The structure of the fluorescent emission layer 82 is the same as that of the first embodiment, and its detailed description will be omitted. Character 82b in FIG. 6 denotes liquid crystal polymer that holds the dichroic fluorescent pigment molecules 82a.

The liquid crystal layer 64 is formed by dispersing liquid crystal in the shape of liquid crystal droplets 64a in the polymer matrix 64b. The structure of the liquid crystal layer 64 is also the same as that of the first embodiment, and its detailed description will be omitted.

If a transparent common electrode is provided, as in the first embodiment, the common electrode is generally formed from indium tin oxide (hereinafter referred to as "ITO"); however, ITO has a high refractive index and has the property of absorbing visible light. As such, if a transparent common electrode is provided between the fluorescent emission layer and the liquid crystal layer, as in the first embodiment, light emitted from dichroic fluorescent pigment of the fluorescent emission layer is reflected or absorbed by the common electrode and may not reach the liquid crystal layer.

On the contrary, if the electrode in the active matrix substrate 62 is a pectinate electrode 72, described above, no common electrode is necessary on the counter substrate 63. Thus, no light is reflected or absorbed by a common electrode of ITO, as discussed above, such that light emitted from dichroic fluorescent pigment 82a of the fluorescent emission layer 82 can be efficiently passed to the liquid crystal layer 64.

The active matrix substrate 62 may be a reflective substrate. In this case, a surface of the substrate 71 of the active matrix substrate 62 constitutes a reflective surface, where light entering the counter substrate 63 or light emitted from dichroic fluorescent pigment molecules 82a of the fluorescent emission layer 82 is reflected from the substrate 71.

Although not shown, an ultraviolet absorbing film may be attached to each side of the display panel 61, as in Variation 1 of the first embodiment.

(Method of Manufacturing Display Panel)

Next, a method of manufacturing a display panel 61 will be described.

First, on a base substrate 81 is formed a fluorescent emission layer 82. As in the first embodiment, the fluorescent emission layer 82 is formed by spin coating, for example. Specifically, dichroic fluorescent pigment molecules 82a are added to the liquid crystal polymer 82b, which is then stirred until the dichroic fluorescent pigment molecules 82a are dissolved to make a mixture. Then, to improve the wettability of the mixture with the base substrate 81, an oriented film is formed on the base substrate 81. Thereafter, the mixture is applied to the oriented film before the base substrate 81 is spun to coat the oriented film with the mixture to a predetermined thickness. After the resulting structure is heated to evaporate the solvent, it is illuminated with ultraviolet light to cure the liquid crystal polymer 82b. Thus, a fluorescent emission layer 82 is formed on the base substrate 81. A spacer that is to be positioned between the fluorescent emission layer 82 and an active matrix substrate 62 is provided on the layer. Thus, a counter substrate 63 is formed.

It should be noted that the mixture may be applied to the oriented film by a slit coater, instead of by spin coating as discussed above.

Next, an oriented film is provided on each of the counter substrate 63 and the active matrix substrate 62. A pectinate electrode 72 and TFTs are formed on the active matrix substrate 62. Since these components may be manufactured in a conventional method of forming electrodes and TFTs, their detailed description will be omitted. A pattern of seal of a light curing resin is formed on the counter substrate 63. Thereafter, droplets of a mixture of liquid crystal, polymer matrix 64b and other ingredients are applied to the counter substrate 63, which is then attached to the active matrix substrate 62 in vacuum.

The pressure is returned to atmospheric pressure and, when the mixture described above is spread in the seal pattern, it is illuminated, from the side of the counter substrate 63, with ultraviolet light having wavelengths not higher than 340 nm removed. Thus, the seal resin is cured to produce PDLC. Thereafter, the counter substrate 3 and active matrix substrate 2, as combined together, are baked to completely cure the seal.

Thus, a display panel 61 as shown in FIG. 6 is provided.

Effects of Second Embodiment

The arrangement of the present embodiment provides effects similar to those of the first embodiment discussed above.

Further, in the present embodiment, the pixel electrodes and common electrode are replaced by a pectinate electrode 72 having linear conductive members 72a that function as pixel electrodes and a common electrode. Thus, no transparent common electrode between the fluorescent emission layer 82 and liquid crystal layer 64 is necessary. As such, light emitted from dichroic fluorescent pigment molecules 82a of the fluorescent emission layer 82 can be prevented from being reflected or absorbed by a transparent common electrode made of ITO or the like. Thus, light emitted from dichroic fluorescent pigment molecules 82a can be efficiently passed to the liquid crystal layer 64 and scattered by the liquid crystal layer 64. This allows the display panel 61 to emit brighter fluorescence.

Third Embodiment

Figure 7:
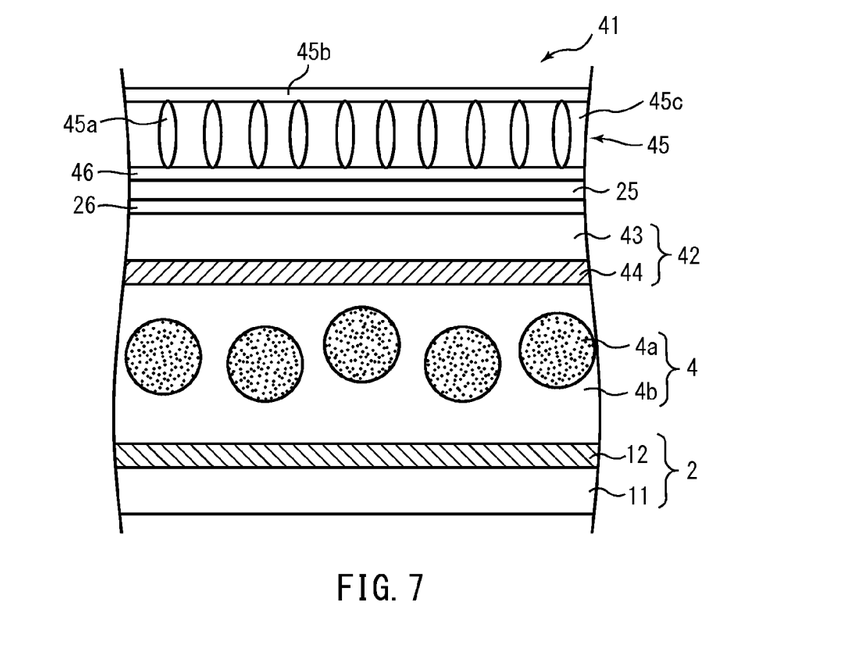
FIG. 7 is a schematic cross-sectional view of a display panel of a display device according to a third embodiment.

FIG. 7 schematically illustrates a display panel 41 according to a third embodiment. This embodiment is different from the first and second embodiments in the configuration of the common electrode. In the following description, the components that are the same as those of the first embodiment are labeled with the same characters, and the differences between the first and third embodiments will be mainly described.

Specifically, as shown in FIG. 7, the counter substrate 42 includes a base substrate 43 and a common electrode 44 formed on the base substrate 43. An ultraviolet absorbing film 25 is attached, by adhesive 26, to the side of the base substrate 43 opposite the side with the common electrode 44. Further, a fluorescent pigment film 45 is attached to the ultraviolet absorbing film 25 by adhesive 46. The fluorescent pigment film 45 is a fluorescent emission layer 23 of the first embodiment that is shaped as a film. That is, a light emitting layer 45c having dichroic fluorescent pigment molecules 45a oriented in such a way that their long molecular axis is in agreement with a thickness direction of the film is provided on a base film 45b that does not absorb ultraviolet light. The adhesive 46 forms a bond layer and the ultraviolet absorbing film 25 corresponds to the bonded portion. The ultraviolet absorbing film 25 forms an ultraviolet absorbing layer.

The above arrangement allows the fluorescent pigment film 45 to efficiently absorb ultraviolet light. Moreover, ultraviolet light not absorbed by the fluorescent pigment film 45 can be absorbed by the ultraviolet absorbing film 25.

Figure 8:
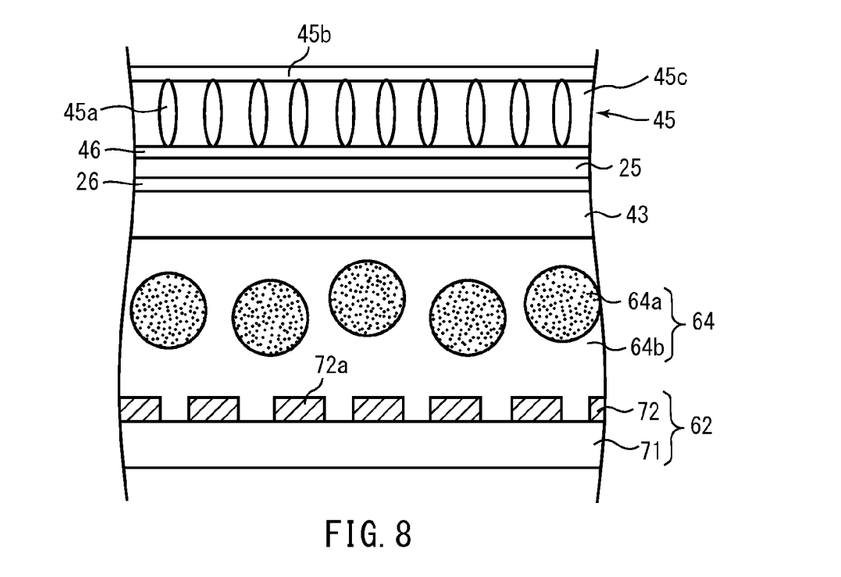
FIG. 8 is a schematic cross-sectional view where features of the display panel of the display device according to the third embodiment are applied to the display panel of the display device according to the second embodiment.

The above features can alternatively be applied to the second embodiment. An implementation with the arrangement applied to the second embodiment is shown in FIG. 8. If the arrangement is applied to the second embodiment, no common electrode 44 is necessary.

Effects of Third Embodiment

In the present embodiment, an ultraviolet absorbing film 25 is attached to the side of the base substrate 43 of the counter substrate 42 opposite the side with the common electrode 44, and a fluorescent pigment film 45 is attached to the ultraviolet absorbing film 25. Thus, since the fluorescent pigment film 45 is located on the top surface of the display panel 41, ultraviolet light can be efficiently absorbed by the fluorescent pigment film 45 to allow the fluorescent pigment film 45 to emit stronger fluorescence. Moreover, since ultraviolet light that has passed through the fluorescent pigment film 45 can be absorbed by the ultraviolet absorbing film 25, ultraviolet light can be prevented from reaching the liquid crystal layer 4. Thus, the liquid crystal layer 4 can also be protected.

Further, as the fluorescent emission layer is a fluorescent pigment film 45, as discussed above, a fluorescent emission layer can be easily formed on the counter substrate 42.

Furthermore, the fluorescent pigment film 45 described above makes it possible to form a fluorescent emission layer after forming a liquid crystal layer 4. During formation of a liquid crystal layer 4, the counter substrate 42 is illuminated with ultraviolet light having wavelengths not higher than 340 nm removed, as discussed above in connection with the first embodiment; as a fluorescent pigment film 45 as described above is to be used, no member absorbing ultraviolet light is present in the counter substrate 42. Thus, during formation of a liquid crystal layer 4, the liquid crystal layer 4 can be efficiently illuminated with ultraviolet light.

Variation of Third Embodiment

Figure 9:
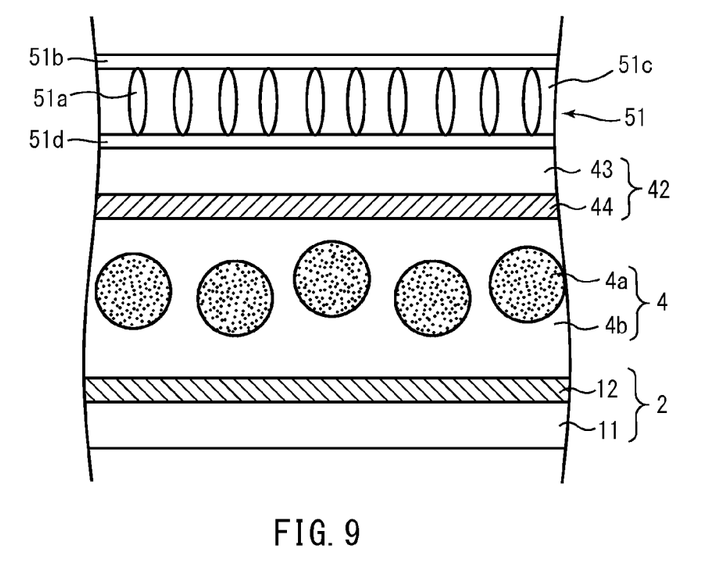
FIG. 9 is a schematic cross-sectional view of a display panel of a display device according to a variation of the third embodiment.

As shown in FIG. 9, this variation is different from the third embodiment in the structure of the fluorescent pigment film 51. In the description below, the components that are the same as those of the third embodiment are labeled with the same characters and only the differences will be described.

Specifically, the fluorescent pigment film 51 includes a base film 51b that absorbs almost no ultraviolet light, a light emitting layer 51c with dichroic fluorescent pigment molecules 51a, and a bonding layer 51d provided on the side of the fluorescent emission layer 51b opposite the side with the base film 51b. The adhesive forming this bonding layer 51d includes an ultraviolet absorbing agent mixed with it that can absorb light with wavelengths not higher than 480 nm (mainly ultraviolet light). The ultraviolet absorbing agent may be a benzotriazole- or benzophenone-based ultraviolet absorbing agent. Thus, this adhesive forms an ultraviolet absorbing layer. The base substrate 43 corresponds to the bonded portion.

This will eliminate the necessity to provide an ultraviolet absorbing film 26, as in the third embodiment, thereby simplifying the manufacturing process.

It should be noted that an ultraviolet absorbing agent may be introduced into the fluorescent emission layer 51b instead of the adhesive agent. This will allow the fluorescent emission layer 51b to absorb almost all ultraviolet light.

The above features can alternatively be applied to the arrangement of FIG. 8.

Further, in the arrangement of FIG. 9, the light emitting layer 51c and the base film 51b may be interchanged. In this case, a bonding layer 51d is provided on the side of the base film 51b opposite the side with the light emitting layer 51c. In this arrangement, an ultraviolet absorbing agent may be suitably introduced into one of the base film 51b and the bonding layer 51d.

Fourth Embodiment

Figure 10:
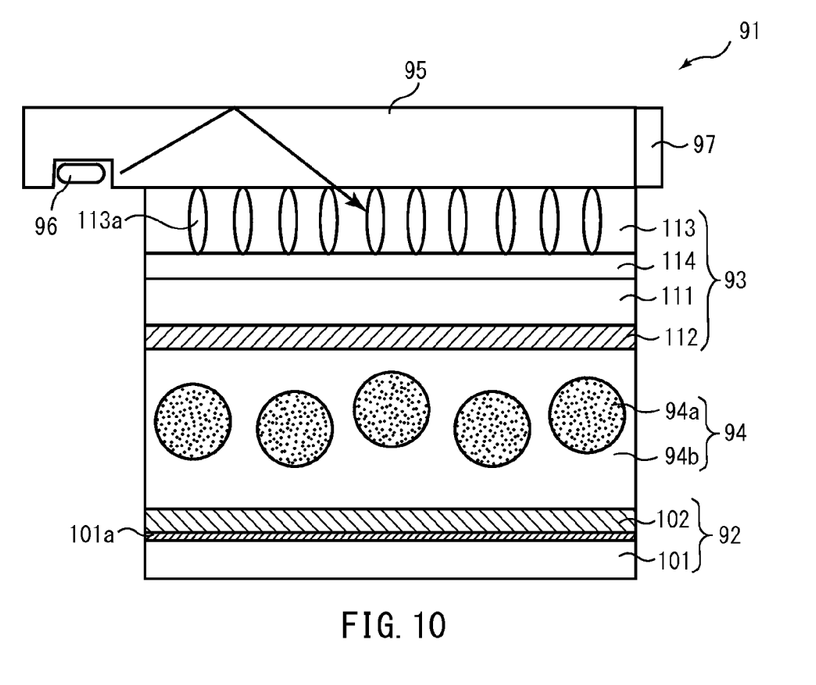
FIG. 10 is a schematic cross-sectional view of a display panel of a display device according to a fourth embodiment.

FIG. 10 schematically shows a display panel 91 according to a fourth embodiment. This embodiment is different from the first embodiment in a light guide plate 95 provided on the fluorescent emission layer 113. The differences between the first and fourth embodiments will be mainly described below.

Specifically, the display panel 91 includes an active matrix substrate 92, a counter substrate 93, a liquid crystal layer 94 sandwiched therebetween, and a light guide plate 95.

The active matrix substrate 92 includes a substrate 101 with multiple pixels provided in a matrix. Pixel electrodes 102 and TFTs (not shown) corresponding to the pixels are also provided on the active matrix substrate 92. A reflective layer 101a is provided on a surface of the substrate 101, and the pixel electrodes 102 are also configured to reflect light. That is, in the present embodiment, the active matrix substrate 92 is a reflective substrate that reflects light.

The counter substrate 93 includes a base substrate 111 made of glass, a common electrode 112 that faces the pixel electrodes 102 of the active matrix substrate 92, and a fluorescent emission layer 113 with dichroic fluorescent pigment molecules 113a. The fluorescent emission layer 113 is bonded, by an adhesive 114, to the side of the base substrate 111 opposite the side with the common electrode 112. In other words, in the counter substrate 93, the common electrode 112 that faces the pixel electrodes 102 of the active matrix substrate 92, the base substrate 111 and the fluorescent emission layer 113 are stacked in this stated order, beginning from the layer close to the active matrix substrate 92. Similar to the pixel electrodes 102 of the active matrix substrate 92, the common electrode 112 of the counter substrate 93 is made of a transparent conductive film. The structure of the fluorescent emission layer 113 is the same as that of the first embodiment, and its detailed description will be omitted.

An ultraviolet absorbing agent is added to the adhesive 114 between the fluorescent emission layer 113 and the base substrate 111. Thus, the ultraviolet absorbing agent in the adhesive 114 can absorb light with wavelengths not higher than 480 nm (mainly ultraviolet light), thereby preventing the liquid crystal layer 94 from being illuminated with ultraviolet light. That is, the adhesive 114 forms the ultraviolet absorbing layer.

The liquid crystal layer 94 is formed by dispersing liquid crystal in the shape of liquid crystal droplets 94a in the polymer matrix 94b. The structure of the liquid crystal layer 94 is also similar to that of the first embodiment and its detailed description will be omitted.

The light guide plate 95 is a transparent member that does not absorb ultraviolet light and is made of an acrylic material or polycarbonate, for example, and is configured to guide light from a light source 96, such as an LED, to the fluorescent emission layer 113. That is, light from the light source 96 is reflected in the light guide plate 95 and is guided to the fluorescent emission layer 113. Thus, as shown in FIG. 10, light enters dichroic fluorescent pigment molecules 113a of the fluorescent emission layer 113 in a direction perpendicular to their long molecular axis. Thus, dichroic fluorescent pigment molecules 113a emit stronger fluorescence than in the case when light enters in a direction parallel to the long molecular axis of the dichroic fluorescent pigment molecules 113a.

The light source 96 is a source of light with wavelengths including photoexcitation wavelengths for the dichroic fluorescent pigment molecules 113a. The light source 96 is preferably an LED that emits ultraviolet light, for example. Such a light source 96 will allow dichroic fluorescent pigment molecules 113a to emit brighter fluorescence.

A reflective plate 97 is provided on the end of the light guide plate 95 opposite the end with the light source 96. The reflective plate 97 reflects light that has advanced to this end of the light guide plate 95 to return it back to the light guide plate 95.

The light guide plate 95, fluorescent emission layer 113 and base substrate 111 are bonded together such that propagation of light is not prevented.

Effects of Fourth Embodiment

In the present embodiment, a light guide plate 95 is provided on the fluorescent emission layer 113 for guiding light from the light source 96 to the fluorescent emission layer 113.

Thus, light enters dichroic fluorescent pigment molecules 113a in the fluorescent emission layer 113 in a direction perpendicular to the long molecular axis of the dichroic fluorescent pigment molecules 113a such that dichroic fluorescent pigment molecules 113a emit brighter fluorescence.

Further, using an LED that emits ultraviolet light as a light source 96 will allow dichroic fluorescent pigment molecules 113a to emit yet brighter fluorescence.

Fifth Embodiment

Figure 11:
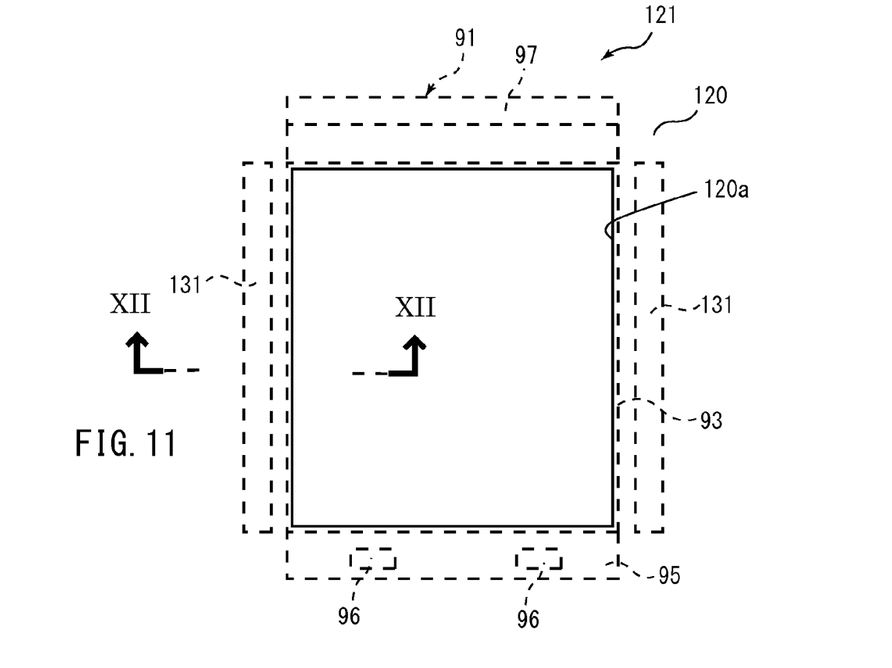
FIG. 11 is a schematic view of a display device according to a fifth embodiment.

FIG. 11 schematically illustrates a display device 121 according to a fifth embodiment. This embodiment illustrates an implementation in which the display panel 91 of the fourth embodiment is combined with solar cells. In the description below, the components that are the same as those of the fourth embodiment are labeled with the same characters, and only the differences will be described.

As shown in FIG. 11, the display device 121 includes a display panel 91 located in an opening 120a of a housing 120 of a cellular phone, for example, and solar cells 131 (which constitute a light generating unit) located at sides of the display panel 91. The display panel 91 has the same configuration as that of the fourth embodiment, where the light guide plate 95 is located in the housing 120 such that the plate is exposed at the opening 120a of the housing 120. The display panel 91 is located in the housing 120 such that the active matrix substrate 92 and the counter substrate 93 are positioned at the opening 120a of the housing 120 as viewed in a planar view.

The light guide plate 95 of the display panel 91 is generally shaped as a rectangle as viewed in a planar view, and two light sources 96, 96 are provided on one end thereof as viewed in a longitudinal direction, and a reflective plate 97 is provided on the other end thereof. Solar cells 131, 131 are located at the two sides of the light guide plate 95 of the display panel 91 as viewed in a lateral direction.

Figure 12:
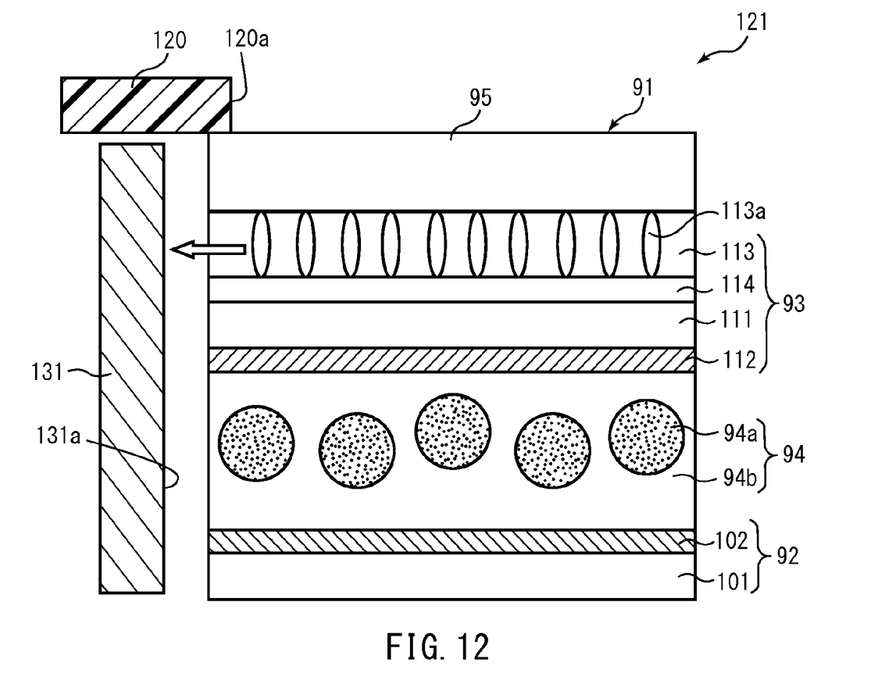
FIG. 12 is a cross section taken on line XII-XII of FIG. 11.

As shown in FIG. 12 in a cross section, each of the solar cells 131 is located such that its electricity generating surface 131a (light receiving surface) that receives light and generates electricity faces an end of the display panel 91 as viewed in a planar direction. Thus, light emitted from dichroic fluorescent pigment molecules 113a of the fluorescent emission layer 113 in a direction perpendicular to their long molecular axis can be received by the electricity generating surface 131a of the solar cell 131. Dichroic fluorescent pigment molecules 113a emit stronger fluorescence in a direction perpendicular to their long molecular axis (i.e. the direction of the hollow arrow in the drawing). Thus, the electricity generating surfaces 131a of the solar cells 131 can receive stronger light emitted from dichroic fluorescent pigment molecules 113a. Thus, the solar cells 131 can efficiently generate electricity.

The solar cells 131 are spaced apart from the light guide plate 95. If the solar cells 131 were closely attached to the light guide plate 95, light supposed to be transmitted to the light guide plate 95 would be absorbed by the solar cells 131. On the contrary, as the solar cells 131 are spaced apart from the light guide 95, as discussed above, it is possible to avoid the solar cells 131 preventing light from being propagated in the light guide plate 95.

Effects of Fifth Embodiment

In the present embodiment, solar cells 131, 131 are located at sides of the display panel 91. Thus, fluorescent light emitted from dichroic fluorescent pigment molecules 113a in the fluorescent emission layer 113 of the display panel 91 can be received by the solar cells 131 to generate electricity.

Moreover, as each of the solar cells 131 has an electricity generating surface 131a facing an end of the display panel 91 as viewed in a planar direction, the electricity generating surfaces 131a can efficiently receive light from dichroic fluorescent pigment molecules 113a. Further, the dichroic fluorescent pigment molecules 113a are located such that their long molecular axis is in agreement with a direction of stacking of the layers of the display panel 91 such that stronger fluorescent light emitted in a direction perpendicular to their long molecular axis exits to the outside of the display panel 91 as viewed in a planar direction. Thus, solar cells 131 with their electricity generating surfaces 131a facing the ends of the display panel 91 as viewed in a planar direction can generate electricity more efficiently.

Furthermore, locating the solar cells 131 as described above will prevent solar light from directly entering the electricity generating surface 131a of a solar cell 131, thereby preventing the temperature of the solar cells 131 from rising. This will prevent decrease in power generation efficiency due to a rise in temperature of the solar cells 131.

Other Embodiments

While the embodiments of the present invention have been described, the above embodiments are merely examples that can be used to carry out the present invention. Thus, the present invention is not limited to the above embodiments, and the above embodiments may be modified as necessary without departing from the spirit of the invention.

In the above embodiments, PDLC is used for the liquid crystal layer. However, polymer network liquid crystal (PNLC), which includes polymer formed in the shape of a network between two plastic films in which liquid crystal molecules are provided may be used for the liquid crystal layer.

In the above embodiments, dichroic fluorescent pigment molecules with their long molecular axis parallel to the direction of their transition dipole moments are used. However, dichroic fluorescent pigment molecules with their short molecular axis parallel to that of their transition dipole moments may be used. In this case, too, the dichroic fluorescent pigment molecules in the fluorescent emission layer may be suitably oriented such that the direction of their transition dipole moments is in agreement with a thickness direction of the fluorescent emission layer.

In the above embodiments, the dichroic fluorescent pigment molecules in the fluorescent emission layer are oriented such that the direction of their transition dipole moments is in agreement with a thickness direction of the fluorescent emission layer. However, the dichroic fluorescent pigment molecules may be oriented in any other directions as long as each molecule has a transition dipole moment with the same direction.

In the above embodiments, the display panel is of a monochrome configuration. However, the display panel may be a display panel capable of multicolor display, such as tricolor. In this case, the dichroic fluorescent pigment molecules in the fluorescent emission layer are preferably oriented such that their long molecular axis (i.e. the direction of their transition dipole moments) is in agreement with a planar direction of the display panel and the direction in which the pixels of the three colors are arranged. Thus, stronger light emitted from dichroic fluorescent pigment molecules in a direction perpendicular to their long molecular axis is emitted into the pixels of the corresponding color, thereby preventing it from being mixed with other pixel colors or preventing light from being absorbed by dichroic fluorescent pigment molecules in pixels for other colors, providing improved display quality. Here, the dichroic fluorescent pigment molecules of three colors, i.e. blue, green and red, must be provided and the pixels for the three colors must be formed in the fluorescent emission layer. Further, if a pectinate electrode as in the second embodiment is used, the conductive members of the pectinate electrode are preferably parallel to the long molecular axis (i.e. the direction of their transition dipole moments) of the dichroic fluorescent pigment molecules. However, the conductive members may be at an angle of 45 degrees or less relative to the long molecular axis (i.e. the direction of their transition dipole moments) of the dichroic fluorescent pigment molecules.

A tricolor fluorescent emission layer as described above may be manufactured by spin coating or ink jet methods. Specific examples of these methods are as follows.

In spin coating, first, blue, green and red dichroic fluorescent pigment molecules are added to liquid crystal polymer to prepare blue, green and red mixtures. A black matrix is formed on the substrate using patterning. Then, an oriented film is applied to the substrate before the mixture of one of the colors is applied to the oriented film by spin coating. The resulting structure is dried to evaporate the solvent before the portions of the other two colors are covered with a mask and illuminated with ultraviolet light to cure the liquid crystal polymer. Then, the uncured portions are washed. This process is performed for the other two colors in a similar manner. This results in a tricolor fluorescent emission layer. It should be noted that spin coating may be replaced by slit coating.

Similarly, in an ink jet method, blue, green and red dichroic fluorescent pigment molecules are first added to liquid crystal polymer to prepare blue, green and red mixtures. A water-repellent black matrix is formed on the substrate. Then, an oriented film is applied to the substrate before the mixture of one of the above colors is applied to the desired pixels by an ink jet method. The resulting structure is dried to evaporate the solvent before it is illuminated with ultraviolet light to cure the liquid crystal polymer. This process is performed for the other two colors in a similar manner. This results in a tricolor fluorescent emission layer.

In the second embodiment, the conductive members 72a of the pectinate electrode 72 function as pixel electrodes and a common electrode. However, an entire pectinate electrode may be used as pixel electrodes while an electrode laminated over the entire surface of the pectinate electrode with an interposed insulating member may function as a common electrode. In this case, an electric field generated between the pectinate electrode and the electrode provided over its entire surface controls liquid crystal in the liquid crystal layer 64.

INDUSTRIAL APPLICABILITY

The display device according to the present invention can be used as a display device capable of emitting fluorescence.

The invention claimed is:
1. A display device comprising:
   a fluorescent emission layer having fluorescent pigment molecules that absorb light to emit fluorescence; and
   a liquid crystal layer capable of switching between a transplant state and a scattering state,
   wherein:
   the fluorescent pigment molecules are dichroic fluorescent pigment molecules with different emission intensities depending on a direction of emission, and the dichroic fluorescent pigment molecules in the fluorescent emission layer are oriented so as to have transition dipole moments with the same direction, and,
wherein an ultraviolet absorbing layer that absorbs ultraviolet light is provided between the fluorescent emission layer and the liquid crystal layer.

2. The display device according to claim 1, wherein:
the fluorescent emission layer includes a light emitting layer formed as a sheet and a bonding layer that bonds the light emitting layer to a bonded portion, and
an ultraviolet absorbing agent is added to at least one of the light emitting layer and the bonding layer.

3. A display device comprising:
a fluorescent emission layer having fluorescent pigment molecules that absorb light to emit fluorescence; and
a liquid crystal layer capable of switching between a transplant state and a scattering state,
wherein:
the fluorescent pigment molecules are dichroic fluorescent pigment molecules with different emission intensities depending on a direction of emission, and
the dichroic fluorescent pigment molecules in the fluorescent emission layer are oriented so as to have transition dipole moments with the same direction, and
wherein:
an electrode is only provided on one side of the liquid crystal layer as viewed in a thickness direction thereof, and
the electrode is a pectinate electrode having comb-teeth shaped portions.

4. The display device according to claim 1, wherein a light guide plate for introducing light from a light source into the fluorescent emission layer is provided on the fluorescent emission layer.

5. A display device comprising:
a fluorescent emission layer having fluorescent pigment molecules that absorb light to emit fluorescence; and
a liquid crystal layer capable of switching between a transplant state and a scattering state,
wherein:
the fluorescent pigment molecules are dichroic fluorescent pigment molecules with different emission intensities depending on a direction of emission, and
the dichroic fluorescent pigment molecules in the fluorescent emission layer are oriented so as to have transition dipole moments with the same direction, and
wherein a photovoltaic unit that receives light emitted from dichroic fluorescent pigment molecules in the fluorescent emission layer and generates electricity is provided outside the fluorescent emission layer as viewed in a planar direction.

6. The display device according to claim 5, wherein the photovoltaic unit is provided with a light receiving face that faces an end of the fluorescent emission layer as viewed in a planar direction.

7. The display device according to claim 1, wherein the dichroic fluorescent pigment molecules in the fluorescent emission layer are oriented such that the direction of the transition dipole moments is in agreement with a thickness direction of the fluorescent emission layer.

8. The display device according to claim 3, wherein the dichroic fluorescent pigment molecules in the fluorescent emission layer are oriented such that the direction of the transition dipole moments is in agreement with a thickness direction of the fluorescent emission layer.

9. The display device according to claim 5, wherein the dichroic fluorescent pigment molecules in the fluorescent emission layer are oriented such that the direction of the transition dipole moments is in agreement with a thickness direction of the fluorescent emission layer.

10. The display device according to claim 3, wherein:
the fluorescent emission layer includes a light emitting layer formed as a sheet and a bonding layer that bonds the light emitting layer to a bonded portion, and
an ultraviolet absorbing agent is added to at least one of the light emitting layer and the bonding layer.

11. The display device according to claim 5, wherein:
the fluorescent emission layer includes a light emitting layer formed as a sheet and a bonding layer that bonds the light emitting layer to a bonded portion, and
an ultraviolet absorbing agent is added to at least one of the light emitting layer and the bonding layer.

12. The display device according to claim 3, wherein a light guide plate for introducing light from a light source into the fluorescent emission layer is provided on the fluorescent emission layer.

13. The display device according to claim 5, wherein a light guide plate for introducing light from a light source into the fluorescent emission layer is provided on the fluorescent emission layer.

* * * * *